United States Patent
Kong

(10) Patent No.: US 9,936,671 B2
(45) Date of Patent: Apr. 10, 2018

(54) TRAINING TOILET

(71) Applicant: RAD INNOVATIONS, INC., Palisades Park, NJ (US)

(72) Inventor: James S. Kong, Palisades Park, NJ (US)

(73) Assignee: RAD Innovations, Palisades Park, NJ (US)

( * ) Notice: Subject to any disclaimer, the term of this patent is extended or adjusted under 35 U.S.C. 154(b) by 519 days.

(21) Appl. No.: 14/468,175

(22) Filed: Aug. 25, 2014

(65) Prior Publication Data
US 2014/0360436 A1 Dec. 11, 2014

Related U.S. Application Data

(63) Continuation-in-part of application No. 13/338,889, filed on Dec. 28, 2011, now Pat. No. 8,816,859.

(51) Int. Cl.
*A01K 15/02* (2006.01)
*A01K 1/01* (2006.01)
*G09B 19/00* (2006.01)

(52) U.S. Cl.
CPC ............ *A01K 1/0107* (2013.01); *A01K 15/02* (2013.01); *G09B 19/0076* (2013.01)

(58) Field of Classification Search
CPC .... A01K 15/021; A01K 1/0107; A01K 15/02; A01K 1/011; A01K 1/0114; A47K 11/04; Y10S 4/902
USPC ....... 119/719, 161, 163, 164, 165, 166, 168; 4/902
See application file for complete search history.

(56) References Cited

U.S. PATENT DOCUMENTS

| | | | |
|---|---|---|---|
| 4,228,554 A | 10/1980 | Tumminaro | |
| 5,652,975 A | 8/1997 | Hoskin | |
| 5,749,324 A | 5/1998 | Moore | |
| 5,978,976 A | 11/1999 | Chai | |
| 6,028,520 A | 2/2000 | Maehre | |
| 6,041,737 A * | 3/2000 | Hennigan | A01K 1/0107 119/161 |
| 6,968,806 B2 | 11/2005 | Helwig | |
| 7,237,278 B1 | 7/2007 | Scott | |
| 7,786,875 B2 | 8/2010 | Wu | |

(Continued)

FOREIGN PATENT DOCUMENTS

WO 2004071182 A1 8/2004

*Primary Examiner* — Yvonne R Abbott-Lewis
(74) *Attorney, Agent, or Firm* — Cowan, Liebowitz & Latman, P.C.; Mark Montague

(57) ABSTRACT

A training toilet for training a dog, cat or other animal, or for a young human child. A space above the first layer receives the trainee, and, upon receipt, activates a switch. The switch includes a pressure actuated mechanical switch or a motion detector switch, which changes state. Based on the change of state, a microcontroller operates to play a number of recorded responses, such as audible recorded encouragements to the trainee, played upon the start of use and exit from the top layer of the toilet. A programmed timing lapse for the plying of audible recordings ensures that the exit message is played only when there has been a predetermined lapse time between the entrance and exit of the trainee. Different modes are provided by different combinations of the recorded messages and different delay periods for the playing of encouragements, which are based on the mode switch operable by the user.

32 Claims, 4 Drawing Sheets

(56) References Cited

U.S. PATENT DOCUMENTS

| | | | |
|---|---|---|---|
| 8,061,300 B2 | 11/2011 | McElroy, Jr. | |
| 2002/0189551 A1 | 12/2002 | Patterson | |
| 2003/0217700 A1* | 11/2003 | Northrop | A01K 1/0114 |
| | | | 119/166 |
| 2005/0087143 A1 | 4/2005 | Doran | |
| 2005/0172907 A1* | 8/2005 | Sharpe | A01K 1/0121 |
| | | | 119/163 |
| 2005/0224005 A1* | 10/2005 | Kim | A01K 1/011 |
| | | | 119/163 |
| 2006/0037549 A1 | 2/2006 | Kim | |
| 2008/0178817 A1* | 7/2008 | Brewer | A01K 1/0121 |
| | | | 119/163 |
| 2009/0241850 A1* | 10/2009 | Campbell | A01K 1/0117 |
| | | | 119/164 |
| 2010/0064975 A1 | 3/2010 | McElroy, Jr. | |
| 2010/0122662 A1* | 5/2010 | Kennington | A01K 1/0114 |
| | | | 119/165 |
| 2010/0206244 A1* | 8/2010 | Liu | A01K 1/0121 |
| | | | 119/719 |
| 2010/0258056 A1* | 10/2010 | Hong | A01K 1/011 |
| | | | 119/163 |
| 2011/0315084 A1* | 12/2011 | Miller | A01K 1/0114 |
| | | | 119/166 |
| 2013/0220235 A1* | 8/2013 | Wisdom | A01K 15/02 |
| | | | 119/719 |

\* cited by examiner

TRAINING TOILET

This application is a continuation-in-part of application Ser. No. 13/338,889, filed on Dec. 28, 2011, the entire disclosure of which is incorporated herein by reference.

BACKGROUND OF THE INVENTION

It is known to use a positive reinforcement message during toilet training to get use of the toilet on a regular basis. The known training toilets are not as widely used as might be the case for a number of reasons including, Applicant believes, a combination of cost, effectiveness and optimum reinforcement.

Accordingly, it is a major object of this invention to provide a training toilet that at a reasonable price will be effective and provide an appropriately optimized reinforcement message.

It is a related purpose of this invention to provide the above in a context which will be comfortably used by the party involved and also without requiring expensive or redundant features.

BRIEF DESCRIPTION

In brief, this invention involves a framework for holding a platform for receiving the trainee. The platform can be a seat or a pad or a base for holding kitty litter. The trainee can be a pet such as a dog or cat or can be a child. The presence of the trainee in the space above the platform is detected by a switch or sensor that provides a signal that enables a microcontroller to process a program that involves playing one or two audible reinforcement messages to the trainee. The sensor that provides this enabling signal to the microcontroller can be a weight responsive switch or a motion detector. Optimally, these messages will be in the voice of someone with whom the trainee is familiar such as an owner or parent.

It is important to provide a message when the trainee (animal or human child) gets off or out of the training toilet. Preferably, this message has to be provided at least a predetermined time period after the trainee is received on or in the training toilet to assure that the trainee has had time to use the toilet. Thus in a preferred embodiment, when the trainee gets on or in the training toilet and the enabling switch is actuated, a timing circuit causes a predetermined time period to lapse before the exit reinforcement message can be played Thus a combination of time lapse and exit response signal provides the a positive reinforcement message at a time which assures that the trainee has completed its waste operation. This will be referred to herein as Mode I.

A Mode II embodiment adds a feature to the Mode I embodiment. In Mode II, the microcontroller is programmed to respond to actuation of the enabling switch to further provide an initial positive reinforcement audio message when the trainee enters or gets onto the training toilet. This entering message is preferably different from the exit message.

A Mode III embodiment is like the Mode I embodiment except that there is no time lapse. The exit positive reinforcement audio message is played whenever the trainee gets off of or exits from the toilet.

A mode IV embodiment is like the mode II embodiment except that there is no time lapse. The entering positive reinforcement message is played when the trainee enters the toilet and the exit reinforcement message is played whenever the trainee exits the toilet.

The microcontroller is set by the user to the desired mode.

Common to all four modes is that a positive reinforcement message may be played when the trainee exits the toilet.

DESCRIPTION OF THE FIGURES

FIG. 1 shows essentially the platform 10, step tray 12, frame 14 and mesh 16 of the training toilet.

DESCRIPTION OF THE PREFERRED EMBODIMENTS

The three embodiments described herein are capable of operating in any one of four modes. The three embodiments are configured and sized for use with different trainees. All three embodiments operate in response to an enabling signal generated by a sensor (switch or motion sensor) changing state thereby providing the signals that causes a microcontroller 32 to execute one of the four programs preselected by the user. Each of the three embodiments can be set by the user to any one of the four modes described herein.

The switch or sensor may be a mechanical switch. The mechanical switch may, for example, be a switch that is activated when a trainee of a particular weight steps on platform 10.

Figure 1:
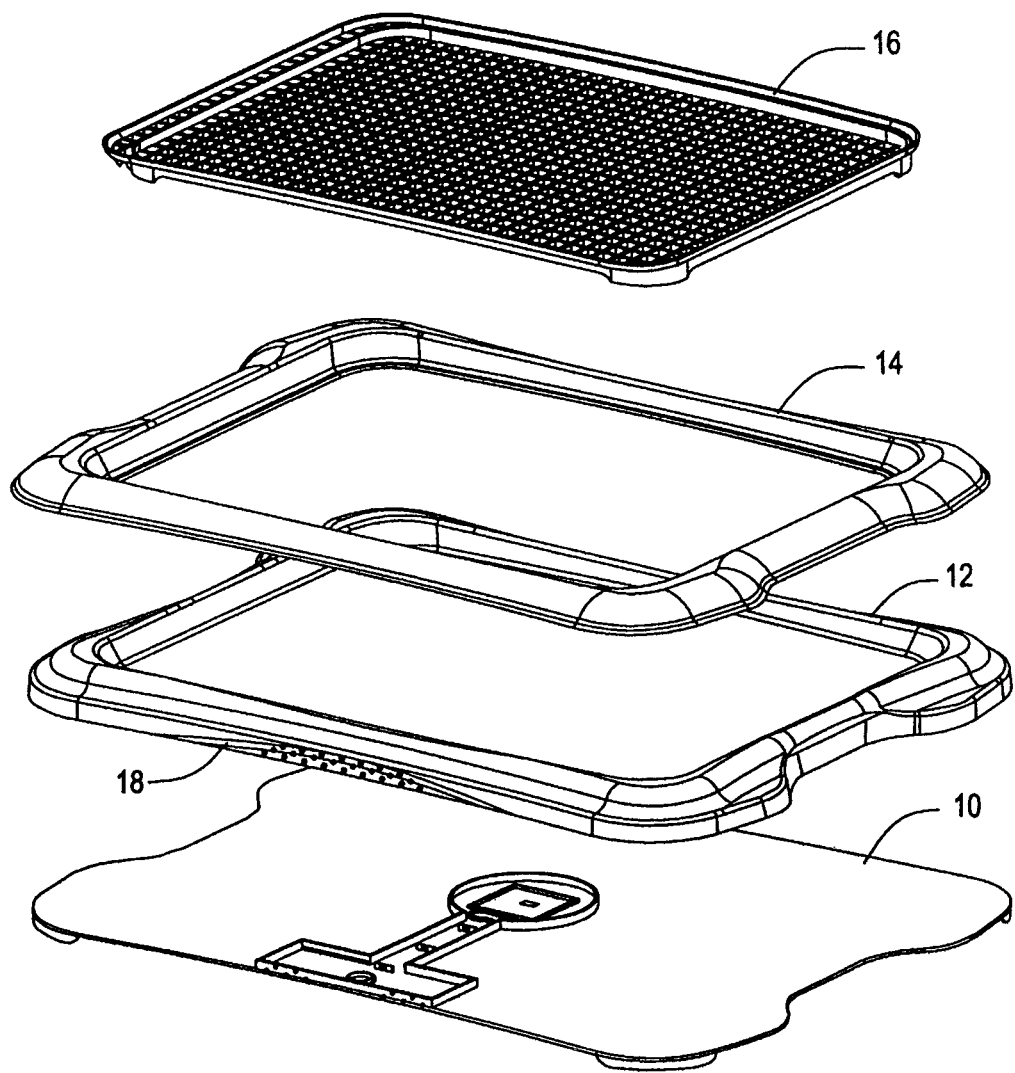
FIG. 1 is an exploded perspective view of an embodiment of the invention adapted for use in the training of a dog.
Figure 2:
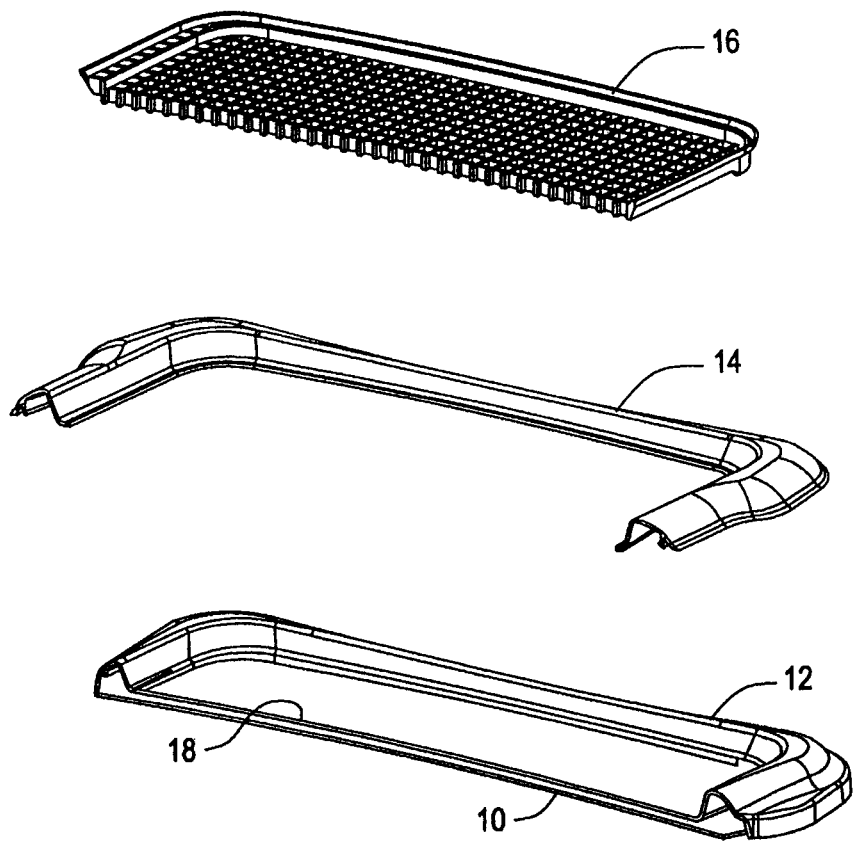
FIG. 2 is an exploded perspective view in cross-section through the upper portion of the FIG. 1 device showing the flexible resilient curved horizontal layer 18 which is deformed when the animal stands on the mesh 16 and which actuates the enabling switch 30 for the microcontroller 32 that controls the electronics and audio recordings. The layer 18, being resilient, returns to its normal non-contact state when the trainee exits.
Figure 3:
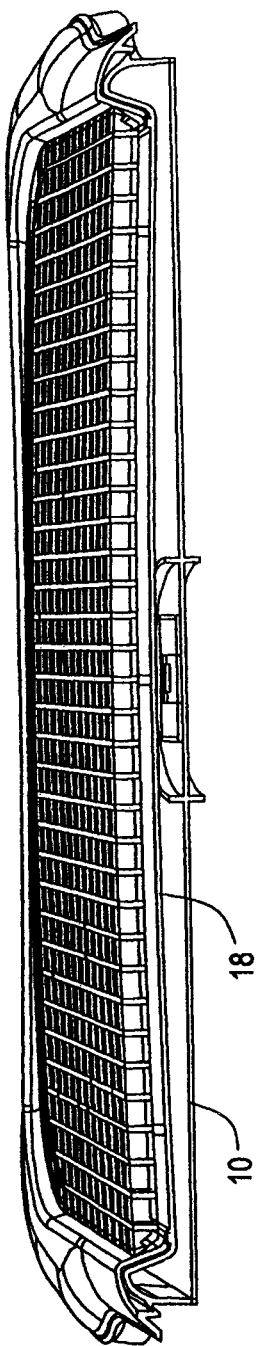
FIG. 3 is a perspective view of the device of FIGS. 1 and 2 assembled.

The first embodiment, shown in FIGS. 1, 2 and 3 is to a dog training toilet having a mesh 16 supported on a step tray 12 to receive the trainee, presumably a dog. A frame 14 holds the mesh 16 and step tray 12. The frame can hold other elements such as a moisture absorbing layer, as is known in the art. The step tray 12 is attached to a platform 10, which platform holds the electronics, The step tray 12 of the FIG. 1 device includes a flexible resilient slightly upward curved layer 18 which responds to the weight of the dog on the mesh 16. A normally open electric switch 30 is positioned between this curved resilient layer 18 and a rigid base 10. When the dog steps into the space above the mesh 16, the weight of the dog on the mesh 16 is transmitted to the flexible layer 18, causing the layer 18 to deflect downwardly and thus close the switch 30. Flexible layer 18 may be referred to as a first layer 18.

Closing the switch 30 provides an initiating enabling signal to the microcontroller 32. The microcontroller 32 then operates in one of the operator preselected modes to provide one or two audio messages. This FIG. 1 embodiment is adapted to train a dog but any appropriately sized animal can be the trainee.

Figure 4:
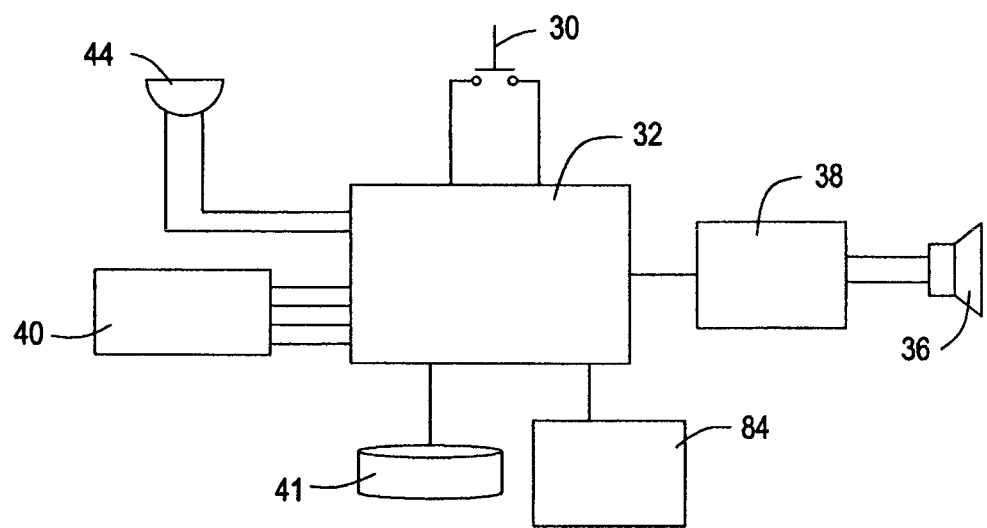
FIG. 4 is a block electrical schematic illustrating the electronic and audio devices and their relationship as employed in all embodiments of this invention.

FIG. 4 shows the electronic control arrangement that is associated with the user selecting any one of four modes of operation for the device of this invention. Closing of the enabling switch 30 provides an initiating signal that causes the microcontroller 32 to control the timing of the one or two messages from the memory 34 that is delivered to the speaker 36 through the speaker driver 38.

The four position mode switch 40 determines the operation of the microcontroller 32 so that the system will operate in one of the four operating modes described above. The mode switch 40 is designed and positioned so that the user can select any one of the four modes. Each of the four leads 40a, 40b, 40c and 40d, provides a separate one of four selection signals to the microcontroller 32. Each of those four selection signals initiates a separate one of the four modes operation of the microcontroller 32. The four modes are set forth in the Brief Description.

It is known in the art how to program the microcontroller 32 for operation in each of the four modes. The change in state of the switch 30 provides a signal indicating that an animal has entered or exited from the space in which the trainee is received. In particular, when the trainee exits from the toilet, the switch 30 opens provides as an exiting signal a state change signal that controls or affects the timing of the playing of the exit message.

Battery 41 power is normally on at all times. Change in state of the enabling switch 30 is the signal that the microprocessor 32 is to operate in accordance with the operator preselected mode. The switch 30 is changed into its closed state in the dog toilet when the dog steps into the toilet and depresses the flexible resilient slightly domed layer 18. The switch 30 is changed into its open state when the trainee gets out of the toilet The switch 30 may be a motion detector switch 53 in embodiments adapted for a cat trainee or motion detector switch in embodiments adapted for a human child trainee.

The switch 30 may be a laser sensor or an infrared light sensor, which detects motion. In this case, the switch 30 would include or be coupled to a sensor which would detect a disturbance in the infrared spectrum or a laser beam. Once such disturbance is detected, appropriate action may be taken such as playing a relevant sound (e.g., a click).

Flexible layer 18 may be attached to base or platform 10 by one or more resilient and flexible springs (the spring layer). The space for the trainee (animal) may be on top of the flexible layer 18 and said switch may be below said flexible layer, Receipt of said trainee on said flexible layer 18 causes said flexible layer 18 to deflect down and change the state of said switch my engaging the springs of the spring layer, and removal of said trainee from said space causes said resilient spring layer to return to its normal state by disengaging the springs of the spring layer and changing the state of said switch.

The battery 41 is a convenient source of energy for operating this device. The battery provides power at all times in the embodiments shown. However a manually operated line switch (not shown) can be included to save battery power during long term non-use.

Memory 34 contains the positive reinforcement message or messages to be coupled to the speaker 36 in accordance with the mode selected by the user. The memory 34 may contain two messages so that in the modes II and IV, an entrance message is played in addition to the exit message played when the animal leaves the toilet.

It should be noted that the microphone 44 which is used to input the message for the memory 34 requires an analog to digital output unit which can be part of the microphone 44 or as a separate downstream item (not shown). Similarly, a digital to analog device (not shown) would be incorporated at the input to the speaker driver 38 as part of the driver 38 or as a separate item.

In another embodiment, a frame provides a space or enclosure which is adapted to receive an animal such as a cat. Once the cat enters into the space, a motion sensor is activated by the cat's movement to close the switch 30. Exit of the cat causes the motion detector to generate the open state of the switch 30. The floor of the interior of this device can be a standard arrangement such as one that employs kitty litter.

A further embodiment of the device of this invention is adapted to the training of a young human child. The device can be employed with either a weight detector switch which is responsive to the weight of the child or a motion sensor which is responsive to the movement of the child getting onto or off of the toilet involved. In the device, a frame provides a seat having a back surface within which is mounted an appropriate motion sensor to provide the enabling signal required for the operation of the FIG. 4 electronic and message providing arrangement. Once the enabling signal has been established, then the FIG. 4 arrangement operates in the one of the four modes preselected by the user or trainer or guardian of the child involved.

It is preferred that all four modes be provided in each embodiment. But a less flexible embodiment could be created that would provide fewer than all four modes.

The audio messages discussed above that may be played upon a trainee either entering and/or exiting from the space in which the trainee is received may also be an audio "click." Clicks are speech sounds that occur as consonants in many languages of southern Africa, and in three languages of East Africa. In American English, a click is sometimes expressed as "tsk tsk" and used to express disapproval or pity, the "tchick" used to spur on a horse, the "clip-clop" sound children make with their tongue to imitate a horse trotting, and similar sounds. Such click sound may, for example, be recorded in an audio file to be played back or may be made via mechanical means. The sound may be, for example, a pen click a keyboard typing click.

If the click is made by mechanical means, it may be made by a resilient member (not shown). The resilient member may be made of metal or plastic. The resilient member may be similar to a Snapple, or similar, bottle cap (in a bottle cap, the clicking sound may be heard when a bottle is opened). That is, a portion of the resilient member may protrude such that when force is applied to the protruding portion, a clicking sound is made, Similarly, when the force stops being applied, a clicking noise may also be made. Layer 18 responds to the weight of the trainee on the mesh 16, which causes layer 18 to deflect downwardly and makes physical contact with at least a portion of the resilient member, causing the mechanical click sound. When the trainee leaves the mesh 16, layer 18 respond to the removal of the weight of the trainee by moving in an upward direction and removing the force from the resilient member and making another click sound.

In the inventor's testing, as opposed to certain other sounds tested, a click has been found by the inventor to soothe animals, serving as positive reinforcement for using the pet toilet described in the present application.

What is claimed is:

1. A toilet for a pet animal comprising:
    a substantially continuous first layer adapted to receive a standing pet animal,
    a space above said first layer for receiving said pet animal, a switch coupled to said first layer automatically changing state in response to receiving said pet animal on said first layer to provide an initiating state for said switch, said switch automatically changing state in response to removal of said pet animal from said first layer to provide an exiting state for said switch, said initiating state and said exiting state accompanied by first and second signals, respectively, wherein said change in the state includes change in the timing of at least one audible record that is played as an encouragement to the pet animal.

2. The toilet of claim 1, further comprising:
an audio recorder responsive to said initiating state to play an initiating audible record as said first signal.

3. The toilet of claim 2, wherein:
said recorder is further responsive to said exiting state to play an exiting audible record as said second signal.

4. The toilet of claim 3, wherein aid audio recorder plays said exiting audible signal only if said exiting state is generated a predetermined time after said initiating state.

5. The training toilet of claim 4, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the state of said switch.

6. The toilet of claim 3, wherein said initiating and exiting audible records are different.

7. The training toilet of claim 3, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the state of said switch.

8. The toilet of claim 2, wherein said audio recorder plays said exiting audible signal only if said exiting state is generated a predetermined time after said initiating state.

9. The training toilet of claim 8, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the state of said switch.

10. The training toilet of claim 2, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the state of said switch.

11. The toilet of claim 1, further comprising:
an audio recorder responsive to said exiting state to play an exiting audible record as said second signal.

12. The toilet of claim 11, wherein said audio recorder plays said exiting audible signal only if said exiting state is generated a predetermined time after said initiating state.

13. The training toilet of claim 12, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the state of said switch.

14. The training toilet of claim 11, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the state of said switch.

15. The training toilet of claim 1, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said first layer to return to its normal upwardly curved state and change the estate of said switch.

16. The training toilet of claim 1, wherein:
said first layer is attached to a base layer by one or more resilient and flexible springs,
said space is on top of said first layer and said switch is below said first layer,
receipt of said pet animal on said first layer causes said first layer to deflect down and change the state of said switch,
removal of said pet animal from said space causes said resilient spring layer to return to its normal state and change the state of said switch.

17. A toilet for a pet animal comprising:
a substantially continuous first layer adapted to receive an animal,
a space above said first layer for receiving said pet animal,
a switch coupled to said first layer automatically changing state response to receiving said pet animal on said first layer to provide an initiating state for said switch,
said switch automatically changing state in response to removal of said pet animal from said first layer to provide an exiting state for said switch, wherein said changing state includes changing the timing of at least one audible record that is played as an encouragement to the pet animal.

18. The toilet of claim 17, further comprising:
an audio click responsive to said initiating state to play a initiating audible click as said first signal.

19. The toilet of claim 18, wherein:
said audio recorder is further responsive to said exiting state to play an click audible as said second signal.

20. The training toilet of claim 19, wherein:
said first layer is resilient, flexible and normally upwardly curved,
said space is on top of said first layer and said switch is below said base layer,
receipt of said pet animal on said base layer causes said base layer to deflect down and change the state of said switch,
removal of said pet animal from said space causes said resilient base layer to return to its normal upwardly curved state and change the state of said switch.

21. The training toilet of claim 18, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said resilient first layer to return to its normal upwardly curved state and change the state of said switch.

22. The toilet of claim 17, further comprising:
an audio click responsive to said exiting state to play an exiting audio click as said second signal.

23. The training toilet of claim 22, wherein:
said first layer is resilient, flexible and normally upwardly curved,
said space is on top of said first layer and said switch is below said first layer,
receipt of said pet animal on said first layer causes first layer to deflect down and change the state of said switch,
removal of said pet animal from said space causes said resilient first layer to return to its normal upwardly curved state and change the state of said switch.

24. The training toilet of claim 17, wherein:
said first layer is resilient, flexible and normally upwardly curved,
said space is on top of said first layer and said switch is below said first layer,
receipt of said pet animal on said first layer causes said first layer to deflect down and change the state of said switch,
removal of said pet animal from said space causes said resilient first layer to return to its normal upwardly curved state and change the state of said switch.

25. A toilet for a pet animal comprising:
a substantially continuous base layer adapted to receive an animal,
a space above said base layer for receiving said pet animal,
a switch coupled to said base layer automatically changing state in response to receiving said pet animal on said base to provide an initiating state for said switch,
said switch automatically changing state in response to removal of said pet animal from said base to provide an exiting state for said switch, wherein said changing state includes changing the timing of at least one audible record that is played as an encouragement to the pet animal.

26. The toilet of claim 25, further comprising:
an audio recorder responsive to said initiating state to play an initiating audible click as said first signal.

27. The toilet of claim 26, wherein:
said audio recorder is further responsive to said exiting state to play an audio reorder as said second signal.

28. The toilet of claim 25, further comprising:
an audio click responsive to said exiting state to play an exiting audio recorder as said second signal.

29. A toilet for a pet animal comprising:
a substantially continuous base layer adapted to receive an animal,
a space above said base layer for receiving said pet animal,
a switch coupled to said base layer automatically changing state in response to receiving said pet animal on said base to provide an initiating state for said motion sensor/switch,
said switch automatically changing state in response to removal of said pet animal from said base to provide an exiting state for said switch, wherein said changing state includes changing the timing of at least one audible record that is played as an encouragement to the pet animal.

30. The toilet of claim 29, further comprising:
an audio recorder responsive to said initiating state to play an initiating audible click as said first signal.

31. The toilet of claim 30, wherein:
said audio recorder is further responsive to said exiting state to play an audio recorder as said second signal.

32. The toilet of claim 29, further comprising:
an audio click responsive to said exiting state to play an exiting audio recorder as said second signal.

\* \* \* \* \*